L. J. GRAHAM.
AUTOMOBILE WHEEL.
APPLICATION FILED MAY 29, 1911.
1,035,181.
Patented Aug. 13, 1912.
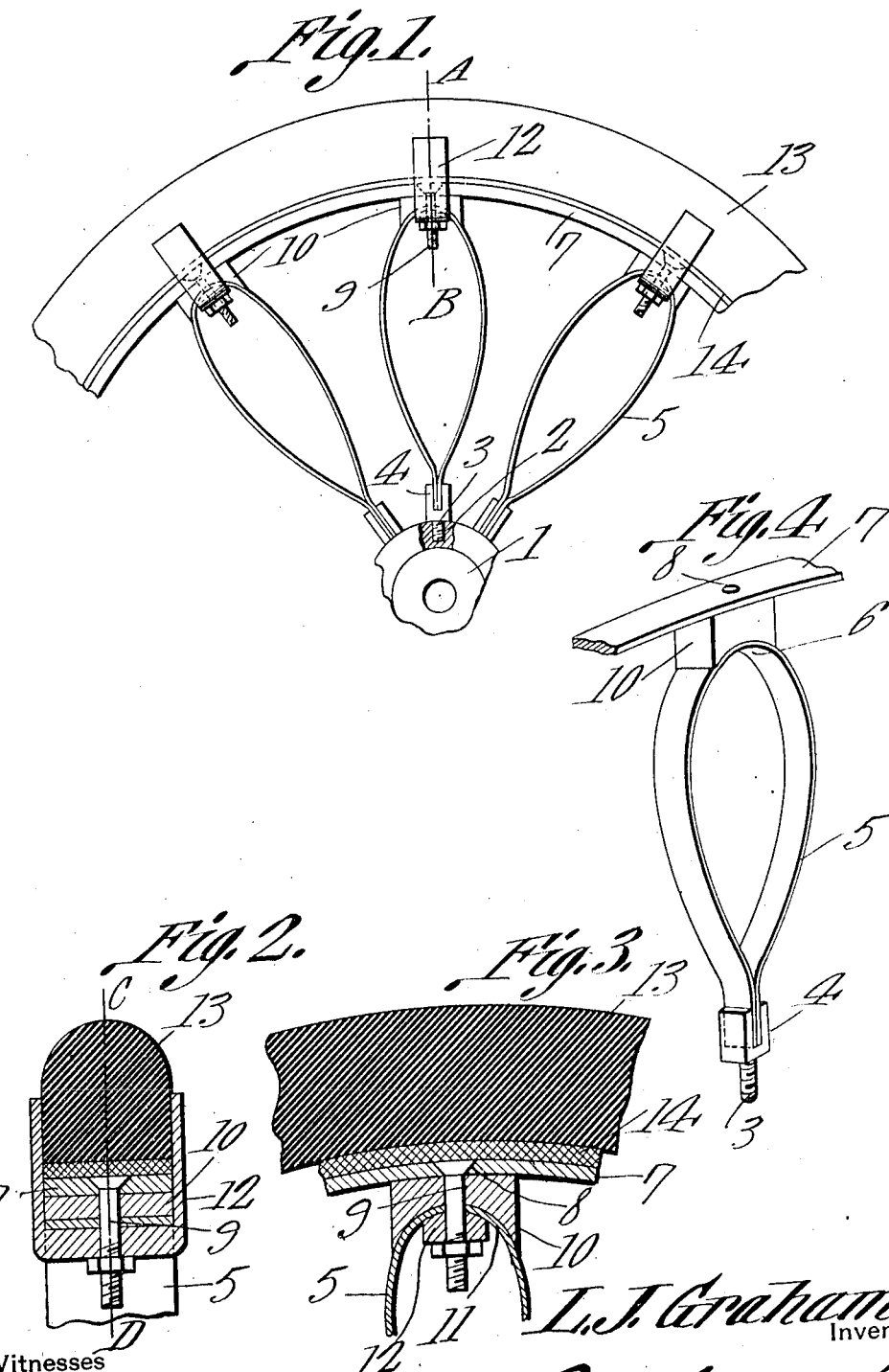

UNITED STATES PATENT OFFICE.

LUTHER J. GRAHAM, OF RICHMOND, CALIFORNIA, ASSIGNOR OF ONE-HALF TO ANANIAS HILL, OF RICHMOND, CALIFORNIA.

AUTOMOBILE-WHEEL.

1,035,181.

Specification of Letters Patent.   Patented Aug. 13, 1912.

Application filed May 29, 1911.   Serial No. 630,004.

*To all whom it may concern:*

Be it known that I, LUTHER J. GRAHAM, a citizen of the United States, residing at Richmond, in the county of Contra Costa and State of California, have invented a new and useful Automobile-Wheel, of which the following is a specification.

This invention relates to automobile wheels and one of its objects is to provide a spring wheel having a soft tread of rubber or the like whereby all of the advantages of an ordinary pneumatic tire are secured without the attendant disadvantages.

Another object is to provide an automobile wheel the parts of which can be easily assembled and will not readily get out of order, said wheel being cheap to manufacture and being in every respect as efficient as an ordinary wheel equipped with a pneumatic tire.

Another object is to provide a wheel of this type which can employ a solid tire of rubber or other suitable material, means being provided whereby this tire is held against accidental displacement relative to the rim of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a side elevation of a portion of a wheel having the present improvements embodied therein. Fig. 2 is an enlarged section on line A—B Fig. 1. Fig. 3 is a section on line C—D Fig 2. Fig. 4 is a perspective view of one of the spokes and of a portion of the wheel rim.

Referring to the figures by characters of reference 1 designates a hub which may be of any suitable material and which is provided, in its peripheral portion, with a plurality of openings 2 adapted to receive screw threaded stems 3 projecting from heads 4. Each of these heads has the parallel contacting ends of a spring strip 5 secured to it in any preferred manner, each spring strip being bent to form a loop constituting one of the spokes of the wheel and the crown or intermediate portion 6 of the loop is adapted to be connected directly to the rim 7 of the wheel. This rim is preferably formed of a continuous strip of metal having countersunk openings 8 therein for the reception of the heads of bolts 9, these bolts constituting means for attaching the intermediate or crown portions 6 of the loops to the rim. If desired seat blocks 10 may be interposed between the intermediate portions 6 of the spokes and the rim, these blocks having concaved faces 11 constituting bearings for the spokes. Where these blocks are utilized, the bolts 9 extend through them. Said bolts also extend through yokes 12 which straddle the intermediate portions 6 of the spokes, the blocks 10 and the rim 7 and the ends of the yokes project radially beyond the periphery of the rim and are adapted to lap the side faces of a tire 13 of rubber or other suitable material. This tire has a rounded tread portion while its sides are flat and its inner face is adapted to fit snugly upon the rim 7 or upon an interposed layer 14 of canvas, felt or other cushioning material. It is to to be understood that one of these yokes 12 is provided for each of the spokes 5 and said yokes will therefore be sufficiently close to hold the tire 13 against lateral displacement relative to the rim. If preferred, however, the tire may be cemented to the rim.

Should it be desired to remove one of the spokes from the wheel, it is merely necessary to unscrew the nut from bolt 9 and then remove the yoke 12 from the bolt. The spoke can then be sprung off of the bolt and rotated so as to unscrew its stem 3 from the hub 1. Another spoke can then be connected to the hub and placed in engagement with bolt 9 after which the yoke 12 can be replaced and secured.

It will be apparent, that when the wheel which has been described, is in use, it will ride easily over any rough or uneven surfaces with the same ease as a pneumatic tire, the solid rubber tread portion serving to properly engage the surface on which the wheel is mounted and the spring spokes and rim yielding sufficiently to absorb all jars produced by the movement of the wheel over the surface.

It will be apparent that a wheel such as herein described is very simple in construction and will not readily get out of order. Moreover any of the parts can be quickly replaced in the event of wear or breakage and without requiring the services of a skilled mechanic.

What is claimed is:—

A spring wheel including a hub, a series of spokes, each spoke including a stem engaging the hub and an elongated looped spring having its terminals secured to the stem, a rim extending around the spokes, a bearing block interposed between the rim and the crown portion of each spoke, that portion of the block contacted by the crown portion being concaved, means for securing the crown portions of the springs and the bearing blocks to the rim, and yokes extending through the loops and straddling the crown portions thereof and the bearing block for holding said block and crown portion against lateral displacement relative to each other and to the rim, the terminals of the yoke being extended radially beyond the rim and constituting tire retaining means.

In testimony that I claim the foregoing as my own, I have hereto affixed my signature in the presence of two witnesses.

LUTHER J. GRAHAM.

Witnesses:
FRED C. SCHRAM,
D. ANDERSON.

Copies of this patent may be obtained for five cents each, by addressing the "Commissioner of Patents, Washington, D. C."